United States Patent
Holland

(10) Patent No.: US 10,753,277 B2
(45) Date of Patent: Aug. 25, 2020

(54) INLET CAP OF AN ENGINE

(71) Applicant: United Technologies Corporation, Farmington, CT (US)

(72) Inventor: Brian K. Holland, Mason, MI (US)

(73) Assignee: Raytheon Technologies Corporation, Farmington, CT (US)

( * ) Notice: Subject to any disclaimer, the term of this patent is extended or adjusted under 35 U.S.C. 154(b) by 724 days.

(21) Appl. No.: 15/221,207

(22) Filed: Jul. 27, 2016

(65) Prior Publication Data
US 2018/0030892 A1 Feb. 1, 2018

(51) Int. Cl.

| F02C 7/04 | (2006.01) |
|---|---|
| B64D 27/10 | (2006.01) |
| F02K 3/06 | (2006.01) |
| F04D 19/00 | (2006.01) |
| F04D 29/32 | (2006.01) |

(52) U.S. Cl.
CPC ............ *F02C 7/04* (2013.01); *B64D 27/10* (2013.01); *F02K 3/06* (2013.01); *F04D 19/002* (2013.01); *F04D 29/329* (2013.01); *F05D 2220/32* (2013.01); *F05D 2230/31* (2013.01); *F05D 2240/12* (2013.01); *F05D 2260/30* (2013.01); *F05D 2300/601* (2013.01); *F05D 2300/603* (2013.01); *F05D 2300/6034* (2013.01); *Y02T 50/672* (2013.01)

(58) Field of Classification Search
CPC ........ F04D 29/329; F04D 19/002; F02C 7/04; B64D 27/10; F02K 3/06; Y02T 50/672; F05D 2300/601; F05D 2300/6012; F05D 2300/603; F05D 2300/6034; F05D 2220/32; F05D 2230/31; F05D 2260/30
See application file for complete search history.

(56) References Cited

U.S. PATENT DOCUMENTS

| 3,799,693 A | 3/1974 | Hull |
| 4,926,963 A | 5/1990 | Snyder |
| 5,252,165 A | 10/1993 | Fecto |
| 5,700,743 A | 12/1997 | Puchinger |
| 5,871,604 A | 2/1999 | Hohman |
| 5,958,166 A | 9/1999 | Walters |
| 6,358,014 B1 | 3/2002 | Chou |
| 6,468,372 B2 | 10/2002 | Kociemba |
| 6,561,763 B2 | 5/2003 | Breakwell |
| 7,650,678 B2 | 1/2010 | Bogue |
| 8,371,009 B2 | 2/2013 | Xie |
| 8,403,624 B2 | 3/2013 | Xie |
| 2007/0079920 A1 | 4/2007 | Holland |
| 2010/0227117 A1* | 9/2010 | Dan-Jumbo ............ B29C 73/10 428/139 |

(Continued)

OTHER PUBLICATIONS

EP search report for EP17183236.3 dated Dec. 21, 2017.

*Primary Examiner* — Moshe Wilensky
*Assistant Examiner* — Jesse M Prager
(74) *Attorney, Agent, or Firm* — Getz Balich LLC

(57) ABSTRACT

Aspects of the disclosure are directed to an inlet cap, comprising: a first lug slot located proximate a perimeter of the inlet cap, and a second lug slot located proximate the perimeter of the inlet cap and located peripherally adjacent to the first lug slot, where the first lug slot includes a first ply, the second lug slot includes a second ply that is different from the first ply, and at least a third ply is common to the first lug slot and the second lug slot.

18 Claims, 3 Drawing Sheets

(56) References Cited

U.S. PATENT DOCUMENTS

| | | | |
|---|---|---|---|
| 2014/0076481 A1* | 3/2014 | Dan-Jumbo | B29C 73/10 156/94 |
| 2015/0003968 A1 | 1/2015 | Maliniak | |
| 2016/0010459 A1 | 1/2016 | Romanowski et al. | |

* cited by examiner

INLET CAP OF AN ENGINE

BACKGROUND

Gas turbine engines, such as those which power aircraft and industrial equipment, employ a compressor to compress air that is drawn into the engine and a turbine to capture energy associated with the combustion of a fuel-air mixture. In an aircraft gas turbine engine a fan is frequently employed towards an axial, forward end of the engine for purposes of air intake. An inlet cap (also referred to as an inlet cone front segment) is located upstream of the fan. The inlet cap, which is composed of plies of composite material, is rotatably mounted to the turbine engine to affect the flow of air into the fan. Examples of inlet caps are described in United States Patent Application Publication Number 20070079920 A1 (hereinafter '920 publication), the contents of which are incorporated herein by reference.

Inlet caps require periodic maintenance to address wear incurred by the inlet cap. Such wear can be caused, for example, by objects (e.g., birds) striking the inlet cap or by particulate matter causing abrasion to exterior surfaces of the inlet cap. In addition, engine maintenance and service procedures can cause wear to the inlet caps.

An inlet cap typically includes lug slots. The lug slots are designed to receive a fastener to secure the inlet cap relative to the engine. The areas/regions of the inlet cap in proximity to the lug slots may be particularly prone to erosion/wear. For example, the fasteners are likely to be accessed during the maintenance/service procedures described above; wrenches or other tools may strike the area/regions of the lug slots during such procedures. In conjunction with another typical scenario, the fasteners may be overtightened which may have an impact on the integrity of composite material used to form the lug slot. Furthermore, in terms of orientation the areas/regions in proximity to the lug slots are substantially perpendicular to the airflow through the engine. In this respect, if an object strikes the inlet cap in proximity to the lug slots, any of the plies of material used in the formation of the inlet cap end up absorbing a substantial amount of the energy associated with the strike.

The techniques used in the repair of an inlet cap described in the aforementioned '920 publication are sufficient when the inlet cap is of a sufficiently large size. As the dimension of the inlet cap decreases, the areas of two adjacent/consecutive lug slots may begin to overlap in terms of their respective material plies.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an inlet cap, comprising: a first lug slot located proximate a perimeter of the inlet cap, and a second lug slot located proximate the perimeter of the inlet cap and located peripherally adjacent to the first lug slot, where the first lug slot includes a first ply, the second lug slot includes a second ply that is different from the first ply, and at least a third ply is common to the first lug slot and the second lug slot. In some embodiments, the first lug slot includes a fourth ply that is different from the second ply. In some embodiments, the first ply and the fourth ply are separated from one another by approximately 0.25 inches. In some embodiments, the first ply is separated from a vertical wall of the first lug slot by approximately 0.5 inches. In some embodiments, the at least a third ply includes at least three plies. In some embodiments, the at least a third ply is substantially continuous with reference to the perimeter of the inlet cap. In some embodiments, the at least a third ply includes a curvature at a location corresponding to an indentation in a profile of the at least a third ply that is between the first lug slot and the second lug slot. In some embodiments, the inlet cap is composed of fibers.

Aspects of the disclosure are directed to an engine of an aircraft comprising: a fan section, a cone forward of the fan section, and an inlet cap coupled to the cone, the inlet cap including: a first lug slot located proximate a perimeter of the inlet cap, and a second lug slot located proximate the perimeter of the inlet cap and located peripherally adjacent to the first lug slot, where the first lug slot includes a first ply, the second lug slot includes a second ply that is different from the first ply, and at least a third ply is common to the first lug slot and the second lug slot. In some embodiments, the first lug slot includes a fourth ply that is different from the second ply. In some embodiments, the first ply and the fourth ply are separated from one another by approximately 0.25 inches. In some embodiments, the first ply is separated from a vertical wall of the first lug slot by approximately 0.5 inches. In some embodiments, the at least a third ply includes at least three plies. In some embodiments, the at least a third ply is substantially continuous with reference to the perimeter of the inlet cap. In some embodiments, the at least a third ply includes a curvature at a location corresponding to an indentation in a profile of the at least a third ply that is between the first lug slot and the second lug slot.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

Figure 1:
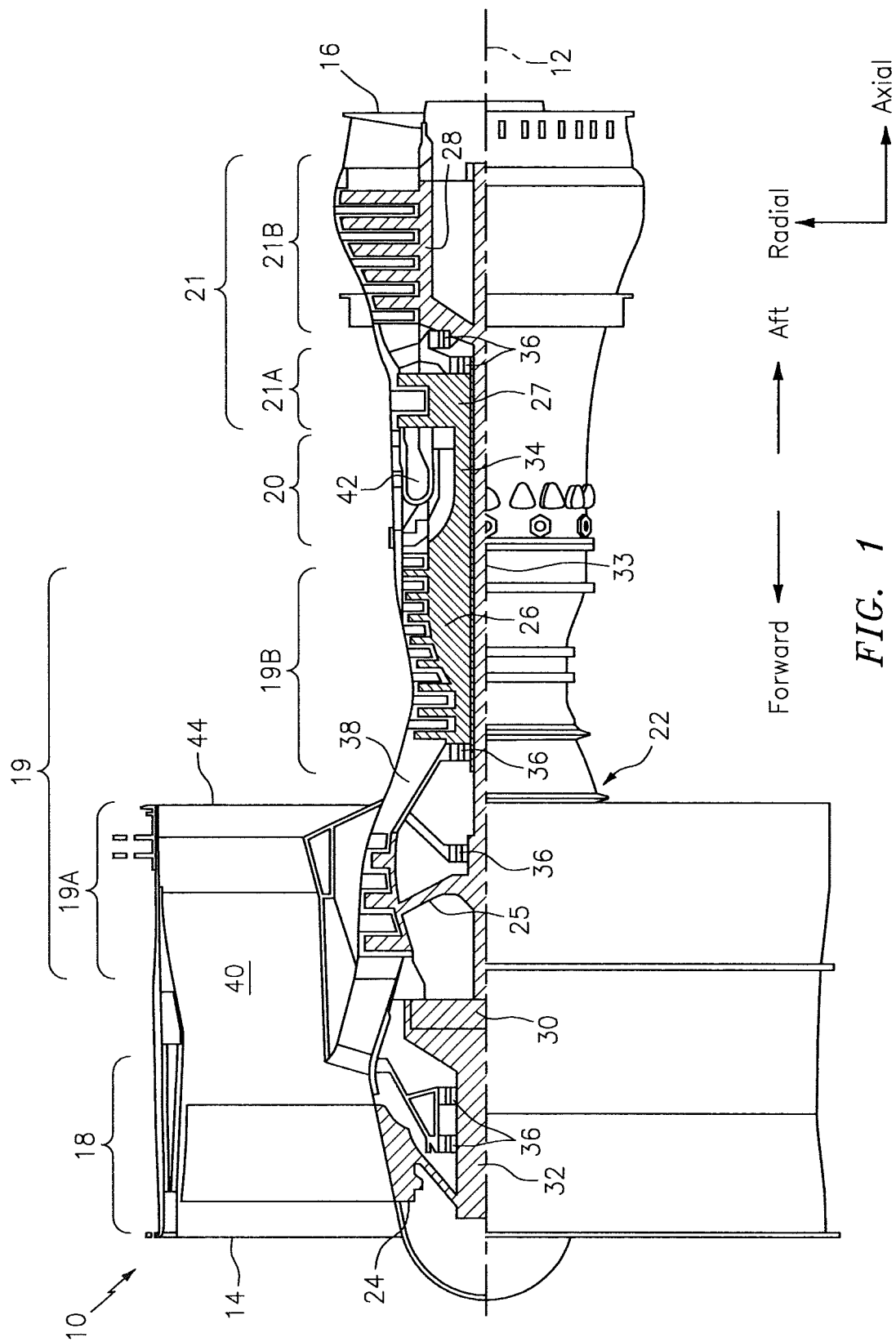
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to an inlet cap of an engine. The inlet cap may include one or more lug slots. The lug slots may be substantially arranged around a perimeter of the inlet cap. The lug slots may be spaced substantially equidistantly from one another around the perimeter of the inlet cap. The inlet cap may be composed of one or more material plies. In some embodiments, a first material ply may be used in a formation of a first lug slot and a second material ply may be used in a formation of a second lug slot. The second lug slot may be peripherally adjacent to the first lug slot. A third material ply may be used in the formation of both the first lug slot and the second lug slot.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
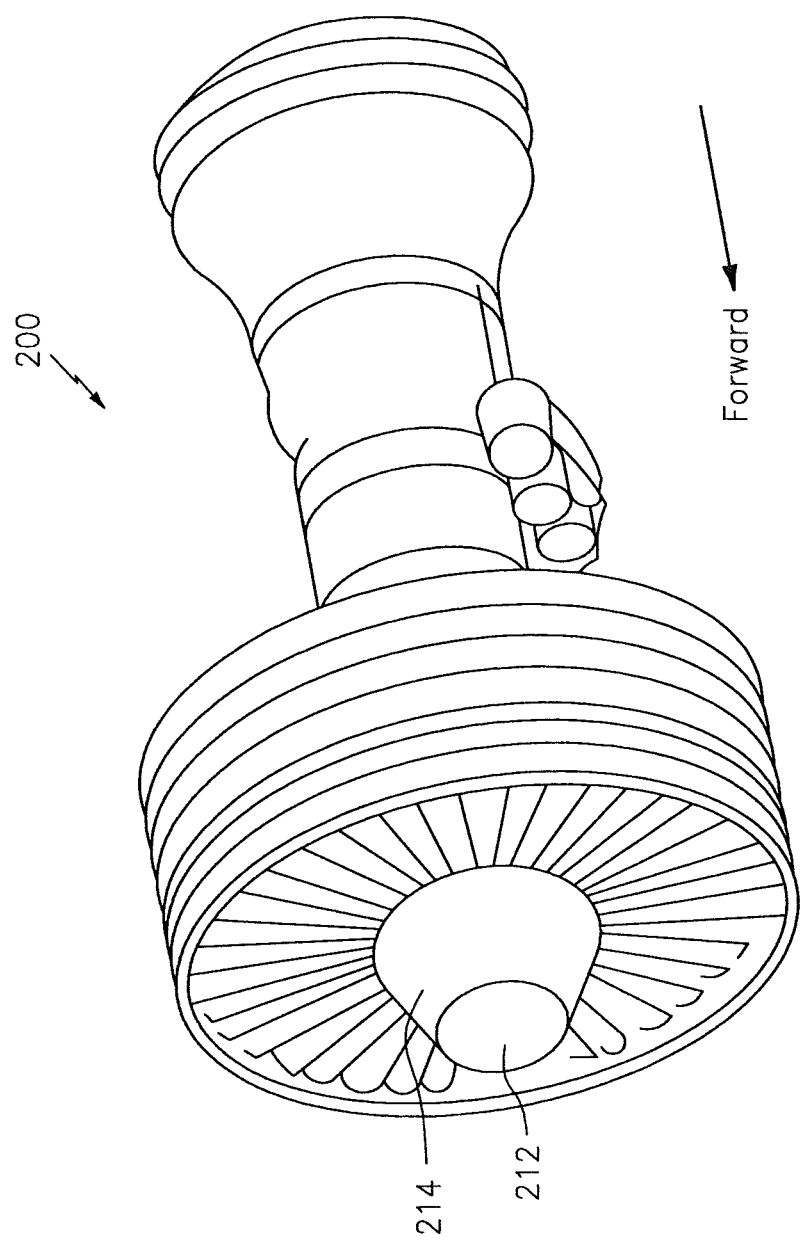
FIG. 2 illustrates a side perspective view of an engine including an inlet cap in accordance with the prior art.

Referring to FIG. 2, an engine 200 in accordance with the prior art is shown. The engine 200 is shown as including a cone 214 at a forward end of the engine 200. An inlet cap 212 is coupled to the cone 214.

Figure 3:
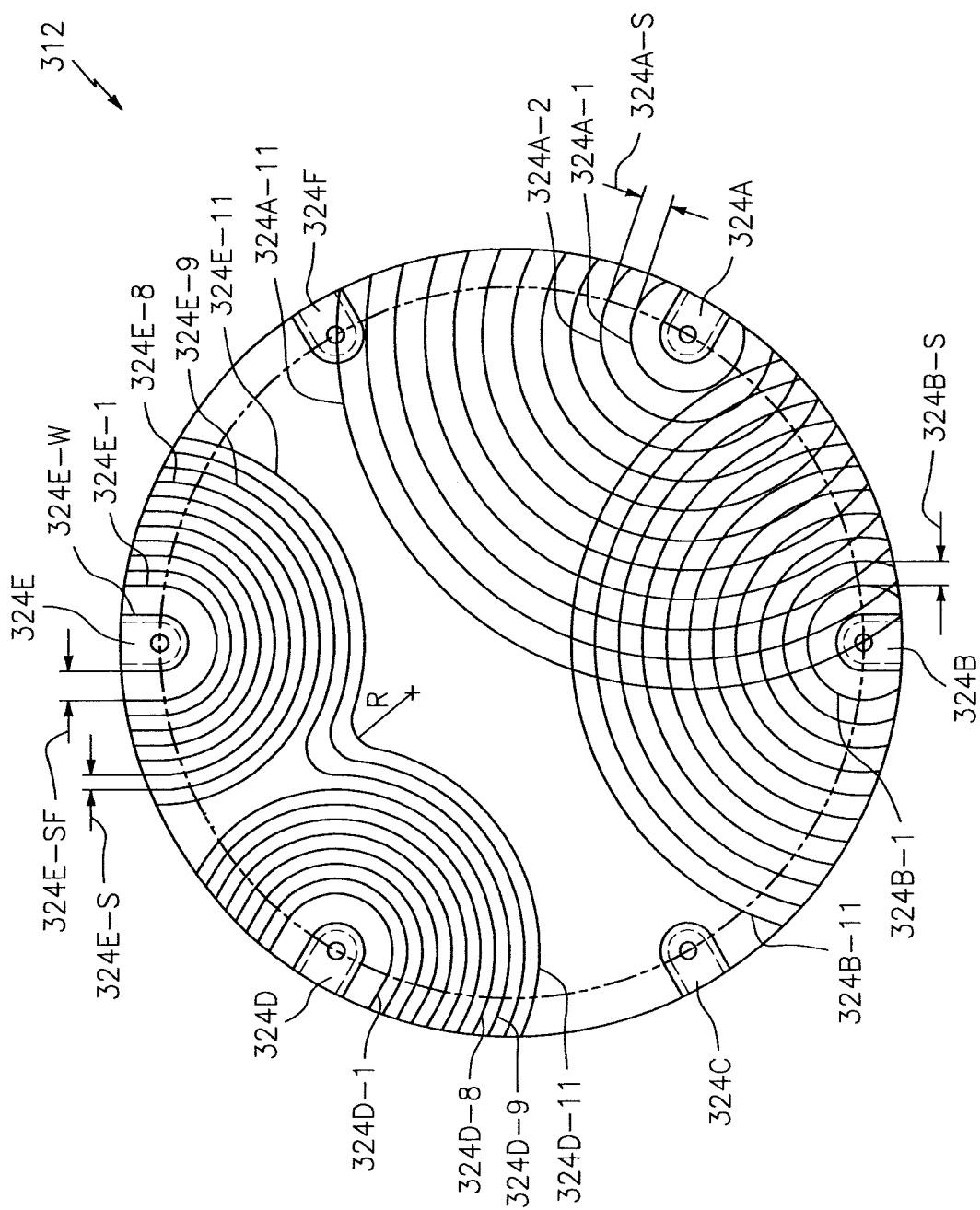
FIG. 3 illustrates a front view of an inlet cap in accordance with aspects of this disclosure.

FIG. 3 illustrates a front view of an inlet cap 312. The inlet cap 312 may be incorporated as part of an engine, such as for example the engine 10 of FIG. 1. The inlet cap 312 may include one or more lug slots, such as for example lug slots 324A, 324B, 324C, 324D, 324E, and 324F.

The inlet cap 312 may be composed of one or more materials. For example, the inlet cap 312 may be composed of fibers, such as Kevlar® fibers as produced by E.I du Pont de Nemours DuPont and Company. The materials of the inlet cap 312 initially may be composed of one or more full layers of fabric. As part of a service operation, one or more cut lines may be made in relation to one or more plies. For example, in relation to the lug slot 324A, eleven plies (denoted as a first ply 324A-1, a second ply 324A-2, . . . and an eleventh ply 324A-11) are shown. The particular number/count of plies that are used may be a function of the desired strength of the inlet cap 312 and/or the maximum speed of an aircraft on which the inlet cap 312 is used. In general, and for a given material that is used in the composition of the inlet cap 312, the faster that the aircraft is flown the greater the number of plies that are needed to withstand a given impact of the inlet cap 312 with an object.

The plies 324A-1 through 324A-11 may be separated from one another with a spacing 324A-S. In some embodiments, the spacing 324A-S may be equal to approximately 0.5 inches (approximately 12.7 millimeters). However, the use of eleven plies with the spacing 324A-S between plies indicates that at least one of the plies (e.g., the ply 324A-11) intersects with at least one adjacent lug slot (e.g., lug slot 324B, 324F).

To avoid this intersection, the spacing between plies may be reduced. For example, in relation to the lug slot 324B, the associated plies 324B-1 through 324B-11 are shown as being separated from one another by a spacing 324B-S, where the value of 324B-S is less than the value of the spacing 324A-S. For example, if the spacing 324A-S is equal to 0.5 inches (12.7 millimeters), the spacing 324B-S may be equal to approximately 0.4 inches (approximately 10.2 millimeters). As shown in FIG. 3, the (reduction in the) spacing 324B-S (relative to the spacing 324A-S) may enable the use of eleven plies (e.g., plies 324B-1 through 324B-11) while avoiding an intersection of those plies with an adjacent lug slot (e.g., lug slot 324A or 324C).

The arrangement described above in relation to the lug slot 324B and the spacing 324B-S between the plies 324B-1 through 324B-11 may be suitable in relation to a servicing operation associated with a single lug slot (e.g., lug slot 324B). However, if the inlet cap 312 requires service in proximity to two or more lug slots, such as for example adjacent lug slots 324D and 324E, it might not be possible to avoid having the plies associated with each of lug slots overlap using the techniques described above while still maintaining the count of plies that are used (illustratively, eleven) and maintaining a minimum spacing between the plies. As described above, the count of plies is correlated with the strength of the inlet cap 312 or the ability of the inlet cap 312 to withstand an object strike. The minimum spacing between the plies that must be maintained is related to (e.g., proportional to) the ratio of the shear strength of resin used to tensile strength of fiber used.

In order to accommodate servicing the material associated with at least two adjacent lug slots, at least one of the plies associated with a first of the lug slots may be common with a second of the lug slots. For example, as shown in FIG. 3, the lug slot 324D may be formed from plies 324D-1 through 324D-11. The lug slot 324E may be formed from plies 324E-1 through 324E-11. At least one of the plies of the lug slot 324D may be common to at least one of the plies of the lug slot 324E. For example, ply 324D-9 may correspond to the ply 324E-9, which is to say that 324D-9 and 324E-9 refer to the same ply. In this respect, the ply 324D-9/324E-9 may be common to the lug slots 324D and 324E. Similarly, the ply 324D-11 may correspond to the ply 324E-11. The continuous nature of the ply 324D-11/324E-11 may be specified with reference to the perimeter of the inlet cap 312.

As shown in FIG. 3, the ply 324D-11/324E-11 may have an associated dimension, e.g., radius of curvature 'R', relative to a point 'X' about the inlet cap 312 that is located proximate an indentation 'I' in the profile of the ply between the lug slot 324D and the lug slot 324E. On one hand, the radius R may have at least a minimum value relative to the center of the inlet cap 312. In some embodiments, the minimum radius R may be approximately equal to 0.25 inches (approximately 6.35 millimeters). On the other hand, the radius R may not exceed a threshold value (otherwise, the plies would intersect similar to what is shown in relation to the plies of the lug slots 324A and 324B, and thereby introduce stresses at the points of intersection). The maximum value of the radius R may be based on a tangent between the centermost quadrant point of each of the two circles that are being joined where the radius R never hits infinity (e.g., a straight line) and may be described as the distance from that quadrant to the center of the circle (if looking down at the sphere like a two-dimensional circle).

As shown in FIG. 3, in relation to the lug slot 324E the associated plies may be spaced from one another in an amount denoted by 324E-S. In some embodiments, the spacing 324E-S may be approximately equal to 0.25 inches (approximately 6.35 millimeters). The first ply 324E-1 may be spaced from a (vertical) wall 324E-W of the lug slot 324E in an amount denoted by 324E-SF. In some embodiments, the spacing 324E-SF may be equal to approximately 0.5 inches (approximately 12.7 millimeters). The use of the spacing 324E-SF may provide a substantially flat surface for forming the first ply 324E-1, thereby avoiding a bunching/warping in the ply 324E-1.

The techniques used in the removal and/or re-application of one more layers/plies of material are known to one of ordinary skill in the art as reflected in the '920 publication. The techniques of the '920 publication may be applied to the material plies of the instant disclosure, potentially as part of one or more maintenance or service operations.

Technical effects and benefits of this disclosure include an enhancement of the structural integrity/strength of an inlet cap of an engine in relation to material plies used in the formation of the inlet cap. For example, by constructing the plies to be substantially continuous with respect to two or more adjacent lug slots stress may be reduced/minimized.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An inlet cap for an aircraft engine, comprising:
   a first lug slot located proximate a perimeter of the inlet cap;
   a second lug slot located proximate the perimeter of the inlet cap and located peripherally adjacent to the first lug slot; and a third lug slot proximate the perimeter of the inlet cap and located peripherally adjacent to the second lug slot;
   wherein the first lug slot includes a first ply extending circumferentially about the first lug slot and not the second lug slot;
   wherein the second lug slot includes a second ply extending circumferentially about the second lug slot and not the first lug slot, and the second ply is different from the first ply;
   wherein at least a third ply is common to and forms the first lug slot and the second lug slot;
   wherein the at least a third ply has an edge with a first convex segment, a second convex segment and a third segment, the first convex segment extends circumferentially about the first lug slot, the second convex segment extends circumferentially about the second lug slot, the third segment extends between the first convex segment and the second convex segment, and the third segment has a different geometry than the first convex segment and the second convex segment; and wherein the at least a third ply does not extend circumferentially about the third lug slot.

2. The inlet cap of claim 1, wherein the first lug slot includes a fourth ply that is different from the second ply.

3. The inlet cap of claim 2, wherein an edge of the first ply and an edge of the fourth ply are separated from one another by 0.25 inches.

4. The inlet cap of claim 1, wherein an edge of the first ply is separated from a vertical wall of the first lug slot by 0.5 inches.

5. The inlet cap of claim 1, where the at least a third ply includes at least three plies.

6. The inlet cap of claim 1, wherein the at least a third ply is continuous with reference to the perimeter of the inlet cap.

7. The inlet cap of claim 1, wherein the at least a third ply includes a curvature at a location corresponding to an indentation in a profile of the at least a third ply that is between the first lug slot and the second lug slot.

8. The inlet cap of claim 1, wherein the inlet cap is composed of fibers.

9. An engine of an aircraft comprising:
   a fan section;
   a cone forward of the fan section; and
   an inlet cap coupled to the cone, the inlet cap including:
      a first lug slot located proximate a perimeter of the inlet cap;
      a second lug slot located proximate the perimeter of the inlet cap and located peripherally adjacent to the first lug slot; and a third lug slot proximate the perimeter of the inlet cap and located peripherally adjacent to the second lug slot;
      wherein the first lug slot includes a first ply and a third ply, and the first ply surrounds the first lug slot and not the second lug slot;
      wherein the second lug slot includes a second ply and the third ply, the second ply is different from the first ply, and the second ply surrounds the second lug slot and not the first lug slot;
      wherein the third ply is common to the first lug slot and the second lug slot, the third ply has an interior edge with a first convex segment, a second convex segment and a third segment extending between the first convex segment and the second convex segment, and the third segment has a different shape than the first convex segment and the second convex segment; and wherein the third ply does not extend circumferentially about the third lug slot.

10. The engine of claim 9, wherein the first lug slot includes a fourth ply that is different from the second ply.

11. The engine of claim 10, wherein an edge of the first ply and an edge of the fourth ply are separated from one another by 0.25 inches.

12. The engine of claim 9, wherein an edge of the first ply is separated from a vertical wall of the first lug slot by 0.5 inches.

13. The engine of claim 9, where the third ply is one of at least three third plies.

14. The engine of claim 9, wherein the third ply is continuous with reference to the perimeter of the inlet cap.

15. The engine of claim 9, wherein the third ply includes a curvature at a location corresponding to an indentation in a profile of the third ply that is between the first lug slot and the second lug slot.

16. An inlet cap for an aircraft engine, comprising:
a first lug slot located proximate a perimeter of the inlet cap;
a second lug slot located proximate the perimeter of the inlet cap and located peripherally adjacent to the first lug slot; and
a third lug slot located proximate the perimeter of the inlet cap and located peripherally adjacent to the second lug slot;

wherein the first lug slot includes a first ply extending circumferentially about the first lug slot and not the second lug slot;

wherein the second lug slot includes a second ply extending circumferentially about the second lug slot and not the first lug slot, and the second ply is different from the first ply;

wherein the at least a third ply is common to the first lug slot and the second lug slot;

wherein the at least a third ply does not extend circumferentially about the third lug slot; and wherein, when viewing from a perspective that looks down onto a front of the inlet cap, the at least a third ply has an edge with a first convex segment, a second convex segment and a concave segment, the first convex segment extends circumferentially about the first lug slot, the second convex segment extends circumferentially about the second lug slot, and the concave segment extends between the first convex segment and the second convex segment.

17. The inlet cap of claim 1, wherein
the first lug slot includes the at least a third ply; and
the second lug slot includes the at least a third ply.

18. The inlet cap of claim 1, wherein the at least a third ply has a second edge that extends along and partially forms a segment of the perimeter that extends between the first lug slot and the second lug slot.

* * * * *